(12) United States Patent
Ressing

(10) Patent No.: US 7,639,264 B2
(45) Date of Patent: Dec. 29, 2009

(54) INTERFACE UNIT AND APPARATUS WITH SUCH AN INTERFACE UNIT AND PROCESS FOR GENERATING AN IMAGE SIGNAL CONTAINING COLOR IMAGE DATA FOR ACTIVATING A COLOR MONITOR

(75) Inventor: Thomas Ressing, Ratekau (DE)

(73) Assignee: Dräger Medical AG & Co. KG, Lübeck (DE)

( * ) Notice: Subject to any disclaimer, the term of this patent is extended or adjusted under 35 U.S.C. 154(b) by 379 days.

(21) Appl. No.: 11/683,103

(22) Filed: Mar. 7, 2007

(65) Prior Publication Data

US 2007/0252840 A1 Nov. 1, 2007

(30) Foreign Application Priority Data

Apr. 27, 2006 (DE) ............... 10 2006 019 545

(51) Int. Cl.
*G09G 5/00* (2006.01)
*G09G 5/02* (2006.01)
*G09G 13/28* (2006.01)
*G09G 5/36* (2006.01)
*G06F 13/14* (2006.01)
*G06K 9/00* (2006.01)
*H04N 11/06* (2006.01)

(52) U.S. Cl. .............. 345/589; 345/581; 345/520; 345/531; 345/549; 382/162; 382/165; 348/488

(58) Field of Classification Search ......... 345/600–601, 345/619, 522, 535, 567, 581, 589, 593, 520, 345/531, 549; 358/523–524, 515, 518; 348/500, 348/502, 469, 473, 496, 520, 582, 612, 488; 382/162–165

See application file for complete search history.

(56) References Cited

U.S. PATENT DOCUMENTS 5,801,665 A * 9/1998 Zhaog et al. ............... 345/600
6,943,806 B2 * 9/2005 Iwai ........................... 345/593

(Continued)

*Primary Examiner*—Sajous Wesner
(74) *Attorney, Agent, or Firm*—McGlew and Tuttle, P.C.

(57) ABSTRACT

An interface unit, a device with the interface unit and a process for generating an image signal containing color image data is provided for activating a color monitor from an image signal containing monochrome image data. The interface unit has an input terminal (16), an output terminal (17) and a processor (18) coupled between the input terminal (16) and the output terminal (17). This processor (18) is set up to receive, via the input terminal (16), a first image signal issued by a monitor activating device (1) of an apparatus for activating a monochrome monitor. The signal contains monochrome image data, at least a part of which represents a number of graphic objects (9, 10), and which is set up to activate a monochrome monitor, such that the graphic objects (9, 10) are displayed on this monitor. One or more colors are assigned to each graphic object (9, 10) by the processor (18) on the basis of a predetermined dependence stored in this processor (18). The processor (18) generates a second image signal containing color image data for activating a color monitor (2') in such a way and prepares it via the output terminal (17) in such a way that with the second image signal, a color monitor (2') connected to the output terminal (17) can be activated, such that the graphic objects (9, 10) with the colors assigned to them are displayed.

29 Claims, 2 Drawing Sheets

U.S. PATENT DOCUMENTS

2001/0024177 A1* 9/2001 Popovich ..................... 345/8
2002/0024480 A1* 2/2002 Iwai ........................... 345/44
2002/0084962 A1* 7/2002 Yamaguchi ................. 345/87
2006/0061586 A1* 3/2006 Brulle-Drews et al. ...... 345/594
2006/0066641 A1* 3/2006 Gally et al. ................. 345/690
2007/0276596 A1* 11/2007 Solomon et al. ............ 701/211

* cited by examiner

INTERFACE UNIT AND APPARATUS WITH SUCH AN INTERFACE UNIT AND PROCESS FOR GENERATING AN IMAGE SIGNAL CONTAINING COLOR IMAGE DATA FOR ACTIVATING A COLOR MONITOR

CROSS REFERENCE TO RELATED APPLICATIONS

This application claims the benefit of priority under 35 U.S.C. § 119 of German Patent Application DE 10 2006 019 545.0 filed Apr. 27, 2006, the entire contents of which are incorporated herein by reference.

FIELD OF THE INVENTION

The present invention pertains to an interface unit, an apparatus with such an interface unit and a process for generating an image signal containing color image data for activating a color monitor.

BACKGROUND OF THE INVENTION

In many areas of technology, apparatus or devices are used that contain a monitor activating means, by means of which the apparatus or devices can display various data such as, for example, operating parameters, measured values, help texts, or alarm messages on a monitor connected to the monitor activating means. The monitor activating means frequently includes a suitably programmed microprocessor and a graphics controller coupled to this. An example of such apparatus or devices are machine controls, which display on a monitor, among other things, operating parameters of the machine, control parameters and measured values.

Another example are technical apparatus which are used in the area of anesthesia and which support the anesthesiologist in his work and which make the anesthesia safer for the patient. Anesthesia apparatus of this type provide not only functions for the accurately dosed supply of narcotics and other medications in the body of the patient, but also functions for monitoring and maintaining the various vital functions of the patient, such as, for example, oxygen supply, circulatory function and breathing. The anesthesia apparatus usually have a monitor activating means with a microprocessor that has been suitably programmed and a graphics controller coupled to this, so that the anesthesia apparatus is able, by means of the microprocessor via the graphics controller, to display apparatus parameters of the anesthesia apparatus, various measured values, which may refer, for example, to the vital functions of the patient or to the amount of narcotics or medications actually supplied, alarm messages and other data on a monitor connected at an output terminal of the graphics controller. These monitors are frequently an integral component of the anesthesia apparatus.

Apparatus and devices of this type, such as, for example, anesthesia apparatus and other medical apparatus, which are used to a large extent in modern medicine, usually have a very high purchase price. In anesthesia apparatus and other apparatus and devices that perform safety-related functions, the high costs are based on the fact that the development is expensive because of the necessary high safety standard and only little savings potential is available in safety-related hardware and software. For this reason, efforts are usually made in practice to use anesthesia apparatus and other apparatus, for example, machine controls over an as long as possible period of time, before they are replaced with newer apparatus. Therefore, many anesthesia apparatus and other apparatus are now still in use, which are designed only for the activation of a monochrome monitor and, correspondingly, are equipped only with a monochrome monitor. In these apparatus, the software and hardware of the monitor activating means or of the microprocessor and of the graphics controller are so limited in their performance and structural design that the activation of a color monitor with a color image signal is impossible. Thus, the microprocessor of a monitor activating means for activating a color monitor with only 256 colors, i.e., with eight bits per image pixel, would already require an eightfold memory space and a considerably higher computing performance than for activating a monochrome monitor with one bit per image pixel, for which it is designed.

Even though the actual dispensing and monitoring functions of anesthesia apparatus themselves are not adversely affected by the use of a monochrome monitor, it has been shown that these functions can be transmitted to the anesthesiologist faster and more reliably by the use of a color visualization of the wide variety of data, some of which are vital. The same also applies to other types of apparatus and devices. In other words, the interface between man and machine can be improved in order to reduce errors. This means not only that a better structuring of the data and a better clarity can be achieved by a color visualization, but also that additional data can be transported by means of colors. Thus, for example, critical measured values or alarm messages can be shown in a color that is different from normal measured values in order to emphasize them on a color monitor and to make them more perceptible for, e.g., the anesthesiologist. Therefore, it is desired in practice to use color monitors and a color visualization of the data advantageously in older anesthesia apparatus and other apparatus and devices as well.

In the state of the art, it has been proposed for anesthesia apparatus to replace the microprocessor and the graphics controller of the monitor activating means of the anesthesia apparatus for this purpose, i.e., to replace these components with a higher-performance microprocessor or with a new or highly revised software and a higher-performance graphics controller, which can generate a suitable color image signal. However, this procedure has the drawback that it entails a high development expense and high costs because of the necessary new hardware and software. In order to keep the costs low and not to take any risk in relation to the application safety, it is generally desirable to make no or only minimal changes to the existing hardware and software.

The same problems also occur in another solution approach from the state of the art, in which the microprocessor of the anesthesia apparatus is equipped with a revised software and is connected to an additional hardware component by circumventing the graphics controller of the anesthesia apparatus, which additional hardware component contains a higher-performance microprocessor and a higher-performance graphics controller. The microprocessor of the anesthesia apparatus with its revised software is, together with the microprocessor of the additional hardware component and the graphics controller of the additional hardware component, powerful enough to activate a color monitor via the graphics controller of the additional hardware component. Even though only the software of the microprocessor has to be changed within the framework of this procedure on the anesthesia apparatus proper, the hardware and software of the additional hardware component are relatively complicated and therefore bring about a high development expense and high costs.

SUMMARY OF THE INVENTION

The object of the present invention is to propose a device and a process, with which an apparatus, which is designed for the activation of a monochrome monitor with an image signal containing monochrome image data, can activate a color monitor in a simple and cost-effective manner and can display data in color on this monitor, wherein the drawbacks are eliminated.

According to the present invention, an interface is provided, which can be coupled between the monitor activating means of an apparatus, such as, for example, an anesthesia apparatus, and a color monitor. The interface unit, which can be designed as an internal component, as a component to be installed in the apparatus or as an external component, has an input terminal, an output terminal and a processing means coupled between the input terminal and the output terminal. The input terminal is designed in such a way that it can be connected to the output of the monitor activating means of an apparatus of this type and an image signal issued by the monitor activating means can reach the processing means.

The interface unit and particularly the processing means are set up to process a first image signal issued by the monitor activating means of an apparatus set up for activating a monochrome monitor, which first image signal contains monochrome image data, at least a part of which represents one or more graphic objects, and which is set up to activate a monochrome monitor, so that the graphic objects are displayed on this monochrome monitor. In other words, monochrome image data are contained in the first image signal, which lead to one or more graphic objects being displayed on the monochrome monitor when the first image signal is sent to this monochrome monitor. Thus, there is a correspondence between a part of the monochrome image data in the first image signal and a graphic object, which is displayed on a monitor activated with the first image signal. In this context a graphic object is defined as any image element displayed on a monitor. Thus, a graphic object may be, for example, both a number indicating a measured value, displayed on a monitor, and this number with a surrounding frame and possibly a background color filling out the frame. Generally, a graphic object is therefore formed by a group of image pixels of the monitor, which display, e.g., certain information, for example, an operating parameter of the apparatus, a measured value and/or an alarm message. In the extreme case, a graphic object may also be formed by only one image pixel.

The processing means is set up to receive such a first image signal via the input terminal of the interface unit and to assign one or more colors to each of the graphic objects on the basis of a predetermined dependence stored in the processing means. In the case of a graphic object that consists of a number and a frame, the same color might be assigned to the number and to the frame, or different colors might be assigned to the number and to the frame. Furthermore, the processing means is set up to generate a second image signal containing color image data for activating a color monitor and to prepare same via the output terminal in such a way that a color monitor connected to the output terminal can be activated with the second image signal, such that the graphic objects with the colors assigned to them are displayed on this monitor.

Having to provide complicated and expensive hardware and software, with which an image signal suitable for activating a color monitor is newly generated from the start, is prevented by using such a processing means. On the contrary, the proven, existing hardware and software of the apparatus and the image signal that is generated by them and is suitable for activating a monochrome monitor can be further used. This image signal is only changed to the extent that a color image signal with the desired color data is formed. Since such an interface unit is advantageously supported to a large extent on the existing hardware of the apparatus and it, itself, does not have to generate the actual information contained in the monochrome image data, it can itself be embodied with a simple and cost-effective hardware and software. Consequently, the development expense is also kept low. In this way, for example, risky interventions with a functioning anesthesia apparatus are not necessary. The present invention only requires that countless graphic objects shall not be displayed.

In a preferred embodiment, one or more colors to be assigned to the respective graphic object are stored in the processing means for each graphic object. These stored colors and their assignment to the individual graphic objects—as well as in the case of the assignment of several colors to a graphic object—form a part of the predetermined dependence stored in the processing means. In this embodiment, the assignment of colors is thus always the same for each graphic object. In the cases in which it is desirable for all objects to have a constant assignment of colors, an interface unit can be embodied in a particularly simple manner in this way.

In an alternative preferred embodiment, the assignment of the colors itself is not stored in the processing means. On the contrary, data, which indicate a part or one or more areas or sections of the monochrome image data in the first image signal, which contains or contain one or more colors to be assigned to the respective graphic object in coded form for each graphic object, are stored in the processing means. Accordingly, the processing means only has data about how it can obtain the assignment of colors from the first image signal. This requires, of course, that the first image signal contains the coded color assignment data. However, only a minimal modification of the apparatus is necessary for this. It is, for example, sufficient if only the software of the microprocessor of a monitor activating means is slightly modified in a suitable manner. The microprocessor of the monitor activating means of the apparatus can easily perform this function, since the first image signal still only contains monochrome image data. Additional data about the assignment of colors are "hidden" only in a small part of the monochrome image data and they are transmitted directly as image content. The image content displayed on an activated monitor being changed at the corresponding points and the original image content being lost do not represent a problem in the suitable selection of the part of the monochrome image data used for the transport of the additional data. Thus, for example, it is frequently possible to select such monochrome image data, which correspond to an area that is not visible on the monitor, and to transmit the additional data, e.g., as additional lines or columns. In this embodiment, the processing means is set up to access the part of the monochrome image data used for the transport of the additional data on the basis of the stored data and to access the corresponding monochrome image data and to decode the corresponding monochrome image data in order to obtain the colors to be used for the assignment of colors. It is obvious that, for this purpose, the corresponding decoding specifications should also be stored or in another way provided in the processing means. This embodiment of the interface is advantageous in the cases in which it is desirable for the individual graphic objects to be able to change their colors, e.g., depending on an operating state or the exceeding of a limit of a measured value.

When it is not possible or desirable to transport the additional data needed for the assignment of the colors in monochrome image data, which correspond to an area not visible on an activated monitor, it is preferable that the processing means is set up to mask the disturbances of the normal image content occurring due to the addition of coded color data into the monochrome image data. For this purpose, predetermined replacement image data are stored in the processing means. These replacement image data may be monochrome image data or color image data. In the first case the processing means is set up to replace the part of the monochrome image data in the first image signal containing the coded color data before the generation of the second image signal with the predetermined replacement image data. In the second case the processing means is set up to replace the part of the color image data of the second image signal with the predetermined replacement image data during or immediately after the generation of the second image signal, which part is affected by the presence of the coded color data in the monochrome image data of the first image signal. By suitably selecting the replacement image data, image errors that are perceptible to humans can be avoided or at least minimized.

In a preferred embodiment, data, which indicate the part of the monochrome image data in the first image signal, which represents the respective graphic object, are stored in the processing means for each graphic object. These data, which are used to identify the graphic objects in the monochrome image data or the part of the monochrome image data, to which the assignment of the colors shall be applied, are a part of the predetermined dependence stored in the processing means. In this embodiment, the position and/or size of the image data within the monochrome image data representing the graphic objects is always the same. In the cases, in which the graphic objects have a constant size and position on the monitor, an interface unit can be embodied in a particularly simple manner in this way.

In an alternative, preferred embodiment, the data themselves which make possible the identification of the monochrome image data corresponding to the graphic objects are not stored in the processing means. On the contrary, data that indicate part or one or more areas or sections of the monochrome image data in the first image signal, which contains or contain in coded form for each graphic object the part of the monochrome image data in the first image signal, which represents the respective graphic object, are stored in the processing means. Accordingly, the processing means contains only data about how it can obtain the corresponding identification data from the monochrome first image signal. This requires, of course, that the first image signal contains the corresponding coded identification as additional data. However, the same considerations apply as in the case described above in detail, in which the monochrome image data contain coded color assignment data. Thus, again only a minimal modification of the apparatus is necessary, and incorporation of the additional data into the monochrome image data does not represent a problem in the suitable selection of the part of the monochrome image data used for the transport of the additional data. Also, it is again possible and possibly advantageous to store suitably selected, predetermined replacement image data in the processing means and to add same into the first or second image signal in the manner described above in detail. The processing means is set up to access and decode the part of the monochrome image data used for the transport of the additional data identifying the graphic objects in the monochrome image data on the basis of the data stored in it, in order to determine the part of the monochrome image data, to which the assignment of colors shall be applied. It is obvious that, for this purpose, the corresponding decoding specifications should also be stored or provided in another way in the processing means. This embodiment of the interface is advantageous in the cases in which it is desirable for the individual graphic objects to be able to change their position and/or size on a color monitor activated with the second image signal, e.g., depending on an operating state or a change in measured value.

It is preferred that the processing means is set up to generate the second image signal in such a way that the color image data of the second image signal correspond to the monochrome image data of the first image signal with the addition of color data. In other words, the monochrome image data for generating the second image signal are preferably changed only to the extent that is necessary for activating a color monitor and for visualizing the graphic objects in the desired colors. The image content remains otherwise unchanged. The monochrome image data, which do not represent a graphic object, to which one or more colors are assigned, are preferably left unchanged provided that the colors of the corresponding color areas are not changed.

In a preferred embodiment, the processing means is set up to receive and to process a first image signal, whose monochrome image data for each image pixel contain a binary value, which indicates the switching state of the respective image pixel, i.e., for example, indicates whether the respective image pixel shall be visualized in black or white. In this case, the processing means is preferably set up to generate the second image signal by each binary value of the monochrome image data corresponding to an image pixel being replaced with a value having a length of at least two bits, which provides the color of the respective image pixel, for generating the color image data of the second image signal. Accordingly, the generated color image data contain a value with an assigned color for each image pixel that belongs to one of the graphic objects and a value, which corresponds to, e.g., white or black for each image pixel that does not belong to one of the graphic objects. The selection of the bit length of the color image data of the second image signal is determined by the number of the desired colors and the abilities of the color monitor to be used. Values with a length of eight bits are sufficient, for example, for 256 colors.

It is preferable if the processing means is set up to generate the second image signal during the reception of the first image signal by the monochrome image data from the processing means being continuously obtained from same during the reception of the first image signal, immediately converted into color image data and used for the continuous generation of the second image signal. In this case, a temporary storage of at least larger quantities of data of the first and second image signals in the processing means can be omitted, so that a memory is not necessary. Such an embodiment has the advantage that it is cost-effective and fast.

In one embodiment, the processing means may have a programmed microprocessor and a memory, which are coupled in a suitable manner. It is preferable if the processing means is embodied by nonconfigurable or by configurable hardware, however. Due to the embodiment of the processing means from the running software, the development times of the processing means can be shortened and their operating safety can be increased. For example, application-specific, integrated circuits (ASICS) are possible as nonconfigurable hardware. As configurable hardware, for example, logic circuits, such as programmable logic devices (PLDs), complex programmable logic devices (CPLDs) or field programmable gate-arrays (FPGAs), which can be programmed by means of hardware programming languages, are possible. Such configurable hardware differs from microprocessors in that they do not run software. On the contrary, their programming determines the structure of the hardware and the logical associations of the hardware components.

The present invention is particularly advantageously to be used in conjunction with an anesthesia apparatus. To this end, a processing means is used, which is set up to receive a first image signal, which is issued by the monitor activating means of an anesthesia apparatus.

In a preferred embodiment, the interface unit according to the present invention is a part of an apparatus (in a preferred embodiment of an anesthesia apparatus) that contains a monitor activating means set up for operating a monochrome monitor, having, e.g., a graphics controller and a data processing means (e.g., a microprocessor) connected to the graphics controller, which monitor activating means is set up to issue a first monochrome image signal which is set up to activate a monochrome monitor, which signal contains monochrome image data, at least a part of which represents the graphic objects, for the display of various data, such as, e.g., operating parameters of the apparatus, measured values and/or alarm messages, in the form of a number of graphic objects on a monochrome monitor by means of the monitor activating means. The input terminal of such an interface unit is connected to the monitor activating means.

The monitor activating means may have a data processing means and a graphics controller which is connected to the data processing means, wherein the data processing means is set up to issue the first image signal by means of the graphics controller, and wherein the input terminal of the interface unit is connected to the graphics controller. In this case, from the signal of the data processing means, which may include, for example, a microprocessor, the graphics controller for the most part generates a serial bit stream, which is expected by most monitors as an activation signal. However, it is also possible for the monitor activating means to comprise only the data processing means, while the graphics controller forms a part of the monitor.

Such an apparatus, for example, an anesthesia apparatus, is preferably embodied in such a way that its monitor activating means is set up to generate the monochrome or first image signal in such a way that a part of its monochrome image data contains in coded form for each graphic object one or more colors to be assigned to the respective graphic object, and/or that a part of its monochrome image data contains in coded form for each graphic object the part of the monochrome image data in the first image signal that represents the respective graphic object. Such an apparatus, whose embodiment, as was described above, only requires a slight change in the programming of the data processing means compared to conventional apparatus, such as, e.g., anesthesia apparatus, has the advantage that data about the assignment of colors and/or about the position and size of the graphic objects are contained as additional data in the monochrome image data. A suitably embodied interface unit, as was already described above, may access these additional data on the basis of data stored in it, and it is possible to create a non-constant assignment of colors and/or size-and position-variable graphic objects. As was already described above in detail, it is particularly preferred if the monitor activating means is set up to generate the monochrome or first image signal in such a way that the part of its monochrome image data, which contains in coded form for each graphic object one or more colors to be assigned to the respective graphic object and/or the part of the monochrome image data in the first image signal, which represents the respective graphic object, are image data, which are not displayed on a monitor activated with the first image signal.

The second image signal may advantageously be generated with a process, in which, at first, a first image signal issued by the monitor activating means of an apparatus, such as, for example, of an anesthesia apparatus, for activating a monochrome monitor, which first image signal contains the monochrome image data, at least a part of which represents one or more graphic objects displaying, for example, apparatus operating parameters, measured values and/or alarm messages, and which is set up to activate a monochrome monitor, so that the graphic objects are displayed on this monitor, is received at a processing means. Subsequently, one or more colors are assigned to each graphic object by the processing means on the basis of a predetermined dependence stored in the processing means. Finally, a second image signal containing color image data is generated in the processing means for activating a color monitor in such a way that a color monitor can be activated with the second image signal, so that the graphic objects with the colors assigned to them are displayed on this monitor. This process has the advantage that an image signal suitable for activating a color monitor does not have to be newly generated from scratch, but rather only an already present image signal containing monochrome image data has to be modified for generating such an image signal.

In a preferred embodiment of the process, one or more colors stored in the processing means for the respective graphic object are assigned to each graphic object. Correspondingly, this process, in which the color assignment is always the same for each graphic object, is particularly simple to carry out in cases, in which it is desirable for all objects to have a constant assignment of colors.

In an alternative, preferred embodiment of the process, the first image signal is generated by the monitor activating means in such a way that a part of its monochrome image data contains in coded form for each graphic object one or more colors to be assigned to the respective graphic object. The processing means, on the basis of data stored in the processing means, which indicate the part of the monochrome image data in the first image signal, which contains in coded form for each graphic object one or more colors to be assigned to the respective graphic object, then accesses this part of the monochrome image data and decodes it to obtain the colors to be used for the color assignment. This procedure is advantageous in cases, in which it is desirable for the individual graphic objects to be able to change their colors, e.g., depending on an operating state or the exceeding of a limit of a measured value.

An apparatus, such as, e.g., an anesthesia apparatus, which issues such a first image signal, only has to be modified minimally, as described above, compared to a conventional apparatus, which issues an image signal containing monochrome image data. It is, e.g., sufficient if only the software of the microprocessor of the monitor activating means is slightly modified in a suitable manner. The microprocessor or monitor activating means can easily perform this function, since the first image signal still only contains monochrome image data. Additional data about the assignment of colors are "hidden" only in a small part of the monochrome image data. The image content displayed on an activated monitor being changed at the corresponding points and the original image content being lost do not represent a problem in the suitable selection of the part of the monochrome image data used for the transport of the additional data. Thus, for example, it is frequently possible to select such monochrome image data, which correspond to an area not visible on the monitor, and to transmit the additional data, for example, as additional lines or columns.

When it is not possible or desirable to transport the additional data needed for the assignment of the colors in monochrome image data, which correspond to an area not visible on an activated monitor, it is preferable when the disturbances of the normal image content occurring due to the addition of coded color data into the monochrome image data are masked. This may occur, on the one hand, by the part of the monochrome image data containing the coded color data in the first image signal being replaced with predetermined, monochrome replacement image data before the generation of the second image signal. On the other hand, the part of the color image data of the second image signal that is affected by the presence of the coded color data in the monochrome image data of the first image signal can be replaced with predetermined color replacement image data during or immediately after the generation of the second image signal. By suitably selecting the replacement image data, image errors that are perceptible to humans can be avoided or at least minimized.

In a preferred embodiment of the process, the first image signal is generated by the monitor activating means in such a way that the assignment and size of the parts or sections or areas of the monochrome image data in the first image signal, which correspond to the graphic objects, are constant with regard to time within the monochrome image data. For the purpose of the assignment of colors and the generation of the second image signal for each graphic object, the processing means then identifies the part of the monochrome image data in the first image signal representing the respective graphic object on the basis of data stored in the processing means, which indicate the corresponding part of the monochrome image data. Since the position and size of the image data representing the graphic objects within the monochrome image data is always the same here, this process can be carried out in a particularly simple manner in cases, in which the graphic objects have a constant size and position on the monitor.

In an alternative, preferred embodiment of the process, the first image signal is generated by the monitor activating means in such a way that a part of its monochrome image data contains in coded form for each graphic object the part of the monochrome image data in the first image signal, which represents the respective graphic object. On the basis of data stored in the processing means, which indicate the part of the monochrome image data in the first image signal, which contains in coded form for each graphic object the part of the monochrome image data in the first image signal, which represents the respective graphic object, the processing means then accesses this part of the monochrome image data and decodes it in order to identify the part of the monochrome image data, which represents the graphic objects. Thus, the first image signal contains the corresponding coded data as additional data. The same considerations apply as in the case described in detail above, in which the monochrome image data contain coded color assignment data. As already explained, this procedure is carried out in a particularly simple manner in cases, in which it is desirable for the individual graphic objects to be able to change their position and/or size on a color monitor activated with the second image signal, e.g., depending on an operating state or a change in a measured value.

When it is not possible or desirable to transport the additional data in the monochrome image data, which correspond to an area not visible on an activated monitor, it is preferable mask such in the monochrome image data, as in the case of the color assignment additional data, when the disturbances of the normal image content occur due to the addition of the additional data. Again, this may occur, on the one hand, by the part of the monochrome image data in the first image signal containing additional data being replaced with predetermined, monochrome replacement image data before the generation of the second image signal, or, on the other hand, by the part of the color image data of the second image signal, which is affected by the presence of the additional data in the monochrome image data of the first image signal, being replaced by predetermined replacement image data during or immediately after the generation of the second image signal. By suitably selecting the replacement image data, image errors that are perceptible to humans can be avoided or at least minimized.

In a preferred embodiment of the process, the second image signal is generated in such a way that color data are added to the monochrome image data of the first image signal. In other words, the monochrome image data for generating the second image signal are preferably only changed to the extent that is necessary for the activation of a color monitor and the visualization of the graphic objects in the desired colors. The monochrome image data that do not represent a graphic object, to which one or more colors are assigned, are preferably left unchanged provided that the colors of the corresponding image areas are not changed.

It is particularly preferable if the first image signal is generated by the monitor activating means in such a way that its image data contain for each image pixel a binary value, which indicates the switching state of the respective image pixel. The second image signal is then generated in such a way that, in the color image data of the second signal, each binary value of the monochrome image data corresponding to an image pixel is replaced with a value having a length of at least two bits, which indicates the color of the respective image pixel. Accordingly, the generated color image data contain a value with an assigned color for each image pixel that belongs to one of the graphic objects and a value, which corresponds, e.g., to white or black, for each image pixel that does not belong to one of the graphic objects. The selection of the bit length of the color image data of the second image signal is determined by the number of the desired colors and the abilities of the color monitor to be used. Values with a length of eight bits are sufficient, for example, for 256 colors.

It is preferable if the second image signal is generated during the reception of the first image signal by the monochrome image data from the processing means being continuously obtained from same during the reception of the first image signal, immediately converted into color image data and used for the continuous generation of the second image signal. In this case, a temporary storage of at least larger quantities of data of the first and second image signals in the processing means can be omitted, so that a memory is not necessary. Such an embodiment has the advantage that it is cost-effective and fast.

In a preferred embodiment, the first image signal is received by the monitor activating means of an anesthesia apparatus.

The present invention is explained in greater detail below on the basis of an exemplary embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
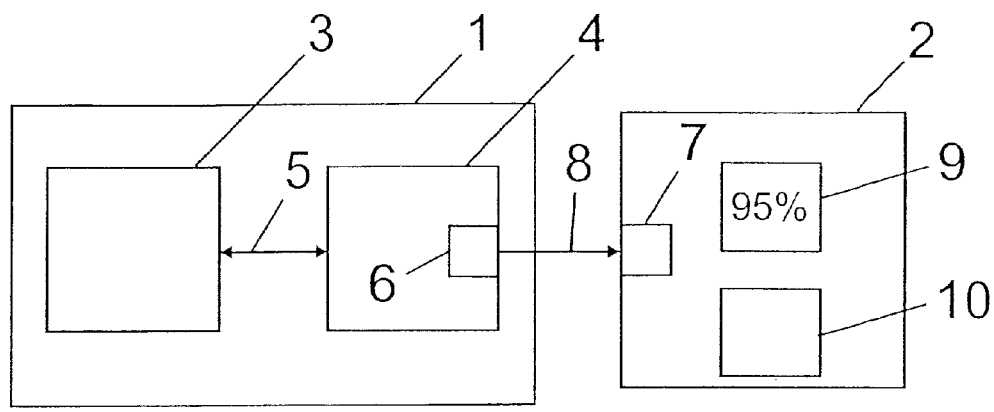
FIG. 1 is a schematic view showing hardware of an anesthesia apparatus provided for activating a monochrome monitor and a monochrome monitor connected to this hardware.

Referring to the drawings in particular, FIG. 1 schematically shows a conventional arrangement consisting of an anesthesia apparatus set up for activating a monochrome monitor. FIG. 1 shows the hardware component 1 of the anesthesia apparatus (otherwise not shown in greater detail) that is set up for the activation of a monochrome monitor. This hardware component 1 is connected to a monochrome monitor 2, which may be a part of the anesthesia apparatus or an external monitor. The hardware component 1 contains a microprocessor 3 and a graphics controller 4, which are coupled in such a way that they may exchange data via a communication connection 5. The output terminal 6 of the graphics controller 4 is connected at the input terminal 7 of the monochrome monitor 2, so that an image signal issued by the graphics controller 4 can reach the monochrome monitor 2 via the communication connection 8 and activate same.

The anesthesia apparatus provides the widest variety of data for the anesthesiologist or another user, which can be displayed on the monochrome monitor 2 connected to the graphics controller 4. For this purpose, the microprocessor 3 is programmed in such a way that it transmits the data to be displayed in a suitably processed form via the communication connection 5 to the graphics controller 4. This microprocessor 3 then generates an image signal containing monochrome image data, which the microprocessor 3 transmits via the output 6 and the communication connection 8 to the input 7 of the monochrome monitor 2. The monochrome monitor 2 is activated by the image signal, so that it displays the data. The displayed data may be, for example, various measured values, apparatus operating parameters or alarm messages. However, the displayed data may also be, for example, help texts or any graphic elements, which may be used, for example, for the clear layout of the monitor display. Each individual datum is displayed on the monochrome monitor 2 in the form of a graphic object. FIG. 1 shows, for example, two graphic objects 9, 10. However, more or less graphic objects may also be displayed. In the example shown, the graphic object 9 is the oxygen saturation value of the blood of a patient connected to the anesthesia apparatus with a surrounding frame, while the information corresponding to the graphic object 10 is not specified in FIG. 1.

Figure 3:
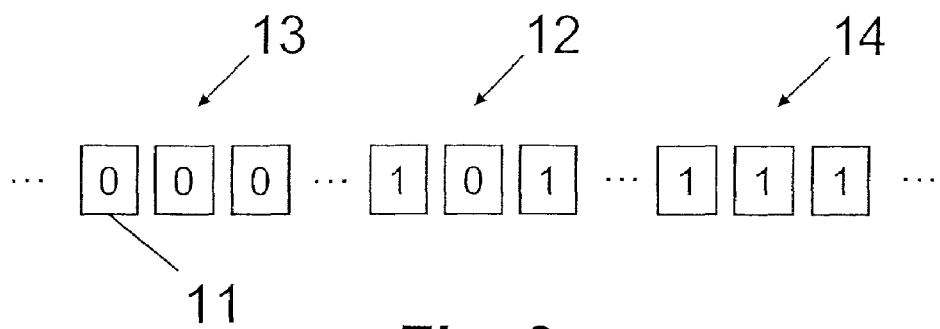
FIG. 3 is a schematic view showing parts of the monochrome image data of an image signal issued by the hardware of an anesthesia apparatus shown in FIGS. 1 and 2.

FIG. 3 shows, as an example and schematically, an unrelated section from the monochrome image data of the image signal that is issued during operation by the graphics controller 4 via its output 6. In the example shown, the monochrome image data are a bit stream, i.e., a sequence of individual binary values 11. Each bit 11 corresponds to an image pixel on the monochrome monitor 2 and indicates whether this image pixel shall be switched on or off. For example, the binary value 0 means that the image pixel shall be switched off or black, and the binary value 1 means that the image pixel shall be switched on or white. It is obvious that parts of these monochrome image data represent the different graphic objects 9, 10, and that the remaining part of the monochrome image data represents the image background. In FIG. 3, for example, the part 12 of the monochrome image data represents the graphic object 10, while the parts 13 and 14 of the monochrome image data represent a black or white background area. This bit stream is transmitted with the image signal in a cyclic repetition with a certain image repeat frequency, so that the image signal regularly transmits current switching states of the individual image pixels to the monitor 2.

Since the image signal which is issued by the graphics controller 4 in FIG. 1 thus contains only monochrome image data, only a monochrome monitor 2 can be activated with this as well or only a monochrome image display can be carried out.

Figure 2:
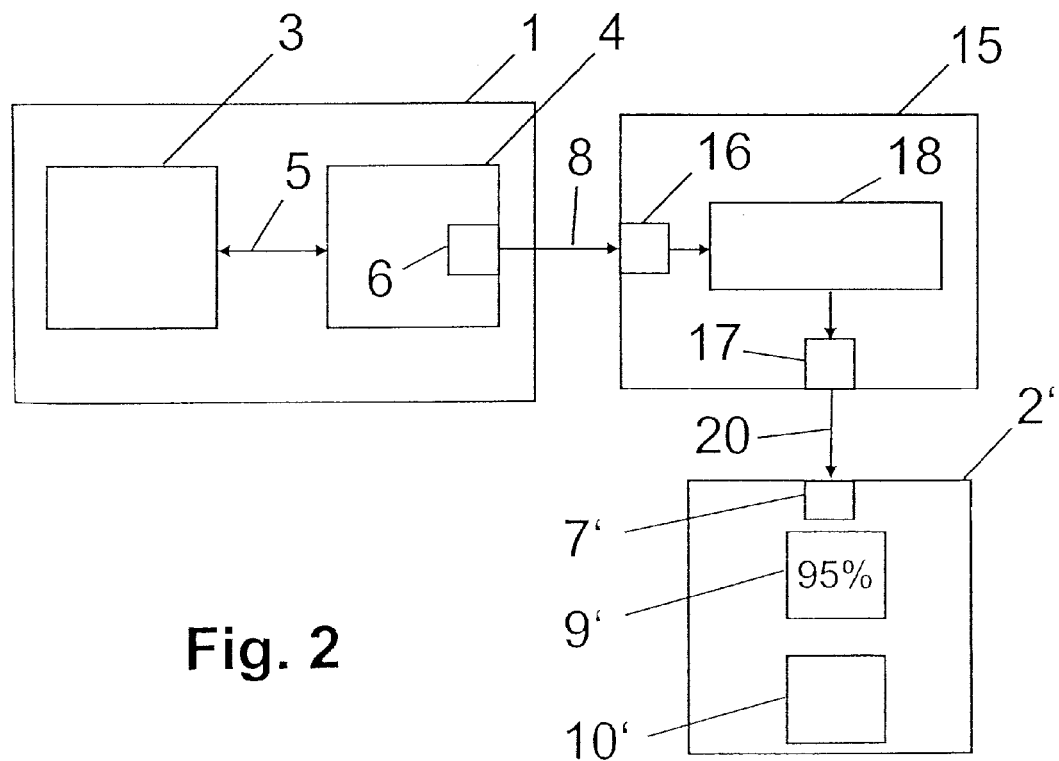
FIG. 2 is a schematic view showing the hardware of an anesthesia apparatus provided for activating a monochrome monitor, an interface unit according to the present invention connected to this hardware and a color monitor connected to the interface unit.

FIG. 2 shows how a color image display can nevertheless be embodied by means of an interface unit 15 according to the present invention coupled between the hardware component 1 and a color monitor 2'. The interface unit 15 has an input terminal 16, an output terminal 17 and a processing means 18 coupled between them in the form of a configurable hardware component, such as, for example, a Programmable Logic Device (PLD) or an Field Programmable Gate Array (FPGA). The input terminal 16 is connected to the output 6 of the graphics controller 4 via the communication connection 8. The input terminal 7' of the color monitor 2' is connected to the output terminal 17 of the interface unit 15 via a communication connection 20.

In this way, during the operation, the monochrome image data with the image signal issued by the graphics controller shown in FIG. 3 reach the processing means 18 via the input terminal 16. In the processing means 18 is stored a predetermined dependence, on the basis of which the processing means 18 can generate a color image signal containing color image data corresponding to the image signal containing monochrome image data, with which color image signal the color monitor 2' can be activated, such that it displays the image displayed only in black and white on the monochrome monitor in FIG. 1 with color graphic objects. This takes place by one or more colors being assigned to each graphic object 9, 10 on the basis of the dependence.

In the case, in which the graphic objects 9, 10 are always located at the same image position and are constant in their size, the bits in an image repeat cycle which correspond to the individual graphic objects and the other image areas are always located at the same point within the bit stream or the monochrome image data. In an embodiment that is particularly suitable for this case, data about which section or which sections of the bit stream corresponds or correspond to the respective graphic object 9, 10 are stored for each graphic object 9, 10 in the processing means 18. Thus, for example, the starting position and the length of the part 12 in the monochromatic data are stored in the processing means 18 for the graphic object 10. If, furthermore, the individual graphic objects shall always have the color assignment, then, moreover, one or more colors to be assigned to each individual graphic object 9, 10 are also stored in the processing means 18. In the exemplary embodiment described, 256 colors are provided, to each of which is assigned a number from 0 to 255, wherein 0 corresponds to black, 128 to red and 255 to white. Thus, one or more numerical values from 0 to 255 are stored in the processing means 18 for each object 9, 10. If, for example, it is desirable for the graphic object 10 to be displayed in red, then the numerical value 128 is stored for the object 10. An individual color might be stored for the graphic object 9, or different colors might be stored for the frame and the number.

Figure 4:
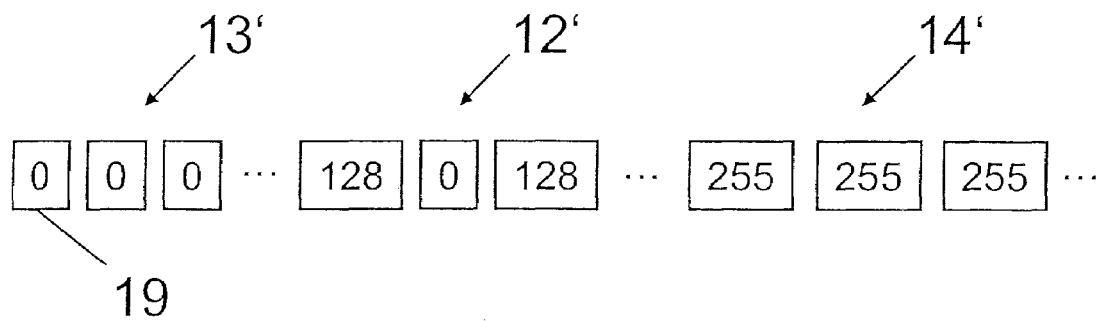
FIG. 4 is a schematic view showing parts of the color image data of an image signal generated by the interface unit according to the present invention.

With these data, the processing means can now, in a simple manner, generate a color image signal from the image signal of the graphics controller 4 containing monochrome image data leading to the desired activation of the color monitor 2', which color image signal contains color image data, which are shown in FIG. 4. For this, eight bits, which can contain each color value from 0 to 255, are assigned to each bit 11 of the bit stream shown in FIG. 3. In other words, the color image signal contains a sequence of groups 19 of eight bits each, each of which corresponds to a bit 11 in the monochrome image data. Thus, each group 19 provides the color of an image pixel.

The assignment takes place in such a way that the color value 0 or 255—i.e., the color black or white—corresponding to the switching state of the bit 11 is assigned for each bit 11 of the monochrome image data that does not belong to a graphic object, depending on its switching state of the accompanying group 19 of color image data, such that, in this respect, the display on the monochrome monitor 2 and the color monitor 2' is identical. Accordingly, the part 13 of the monochrome image data comprising three bits, which represents a black background area, becomes a part 13' of the color image data comprising three groups 19 of eight bits each, wherein each group 19 contains the value 0 for the color black. In exactly the same way, the part 14 of the monochrome image data comprising three bits, which represents a white background area, becomes a part 14' of the color image data comprising three groups 19 of eight bits each, wherein each group 19 contains the value 255 for the color white. To visualize the graphic object 10 represented by the part 12 of the monochrome image data in red, the value 128 for red is assigned to the accompanying group 19 of the color image data for each white bit 11 of the part 12 of the monochrome image data, while the value 0 for black is assigned to the accompanying group 19 of the color image data for each black bit 11 of the part 12 of the monochrome image data. Accordingly, the part 12 of the monochrome image data comprising three bits shown in FIG. 3, which represents the graphic object 10, becomes the part 12' of the color image data comprising three groups 19 of eight bits each shown in FIG. 4.

Figure 5:
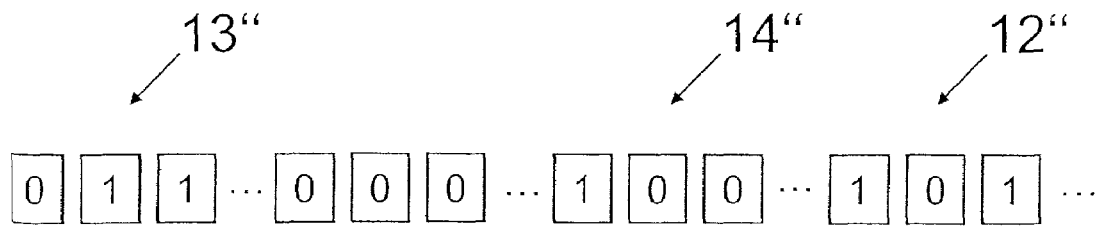
FIG. 5 is a schematic view showing parts of the monochrome image data of an image signal issued by the hardware of an anesthesia apparatus shown in FIGS. 1 and 2 in a different image repeat cycle in relation to FIG. 3.

Provided that the assignment of colors to the individual graphic objects 9, 10 and/or the position or size of the individual graphic objects 9, 10 is not constant, the described procedure and embodiment of the interface unit 15 should be slightly modified. In this case, the storage of the color to be assigned to the graphic object 10 or the storage of the position and length of the part 12 of the monochrome image data corresponding to the graphic object 10 within the bit stream is no longer possible. In other words, in these cases the processing unit cannot perform the assignment of colors only on the basis of color data stored in it or on the basis of data about the position and length of a part 12 representing a graphic object 10 within the monochrome image data stored in it. FIGS. 3 and 5 show an example of such monochrome image data. FIG. 3, which has already been described, shows the monochrome image data in an image repeat cycle, and FIG. 5 shows the monochrome image data in another image repeat cycle. A comparison of FIG. 5 with FIG. 3 shows that the parts 13 and 14 of the monochrome image data from FIG. 3 in FIG. 5 each contain a bit combination changed for a reason explained below (and are therefore designated by 13" and 14", respectively), and that the position of the part 12 within the monochrome image data and thus the position of the graphic object 10 on a monochrome monitor 2 activated with the image signal has been changed.

In order to make possible the assignment of colors to the graphic objects 9, 10 in this case as well, the software of the microprocessor 3 of the hardware component 1 is slightly modified in such a way that additional data, which enable the processing means 18 to perform the desired assignment of colors, are added in coded form into the monochrome image data that are contained in the image signal issued by the hardware component 1. However, this does not occur by the hardware component 1 being changed, such that it issues an image signal containing color image data. On the contrary, the image signal issued by the hardware component 1 still contains only monochrome image data in the form of a bit stream, whose individual bits each correspond to an image pixel. Instead of this, the additional data are transmitted as image content by the bits corresponding to image pixels in predefined areas of the monochrome image data known to the processing means 18 being changed. Thus, the additional data are, as it were, transmitted as locally limited image disturbances.

In the present example, data, on the basis of which it is known to the processing means 18 that the color to be assigned to the graphic object 10 is contained in the right two bits of the part 13, 13" of the monochrome image data in coded form, and that the position of the part 12 within the monochrome image data is stored in the right two bits of the part 14, 14" of the monochrome image data in coded form, are stored in the processing means 18. In FIG. 5, not only has the position of the part 12 within the monochrome image data been changed, but also the graphic object 10 shall be shown in a different color. Correspondingly, these bits have changed their values. The processing means accesses these bits and decodes the information contained in them. Subsequently, the assignment can be performed as in the case of constant colors and positions. Since the image areas represented by the parts 13, 13" and 14, 14" are static background areas, it is readily possible to store the "original" bit pattern in the processing means 18 and to overwrite the changed parts 13" and 14" after decoding the additional data with the stored bit patterns in order to maintain a genuine image signal with the "original" parts 13 and 14.

Since only two bits are used in the present case for each additional datum, only four different colors and four different positions can be communicated to the processing means 18. In practice, more bits are therefore used for each additional datum. For the remaining graphic objects 9, the additional data are transmitted in the same way.

While specific embodiments of the invention have been shown and described in detail to illustrate the application of the principles of the invention, it will be understood that the invention may be embodied otherwise without departing from such principles.

What is claimed is:

1. An interface unit, comprising:
    an input terminal;
    an output terminal;
    a processor means coupled between said input terminal and said output terminal, said processor means for receiving, via said input terminal, a first image signal issued by a monitor activating means of an apparatus for activating a monochrome monitor, which contains monochrome image data, at least a part of said monochrome image data representing a number of graphic objects, said monochrome image data for activating a monochrome monitor for display of said graphic objects thereon, said processor means for assigning one or more colors to each graphic object on a basis of a predetermined dependence stored in said processor means and said processor means for generating a second image signal containing color image data for activating a color monitor and preparing said second image signal via said output terminal such that said color monitor connected to said output terminal can be activated with said second image signal, such that said graphic objects with colors assigned thereto on such color monitor.

2. An interface unit in accordance with claim 1, wherein said predetermined dependence stored in said processor means for each said graphic object includes one or more colors assigned to said respective graphic objects so that a fixed color assignment is predetermined for each said graphic object.

3. An interface unit in accordance with claim 1, wherein said predetermined dependence stored in said processor means comprises data, which provide a part of the monochrome image data in the first image signal, which contains one or more colors to be assigned to said respective graphic object in coded form for each said graphic object, said data being stored in said processor means, wherein said processor means analyzes and decodes a part of the monochrome image data on the basis of the stored data in order to obtain the colors to be used for the color assignment.

4. An interface unit in accordance with claim 3, wherein predetermined replacement image data are stored in said processor means, wherein said processor means replaces a part of the monochrome image data in the first image signal that contains one or more colors to be assigned to said respective graphic object in coded form for each said graphic object before generating the second image signal with the predetermined replacement image data or to replace the part of the color image data corresponding to this part in the color image data of the second image signal with the predetermined replacement image data during the generation of the second image signal.

5. An interface unit in accordance with claim 1, wherein data which provide a part of the monochrome image data in the first image signal, which represents said respective graphic object, are stored in said processor means for each said graphic object as part of said predetermined dependence stored in said processor means.

6. An interface unit in accordance with claim 1, wherein said predetermined dependence stored in said processor means includes data to provide a part of the monochrome image data in the first image signal, which contains the part of the monochrome image data for each said graphic object in coded form in the first image signal, which represents said respective graphic object, said data being stored in said processor means, said processor means analyzing and decoding the part of the monochrome image data containing the coded data on the basis of the stored data.

7. An interface unit in accordance with claim 6, wherein predetermined replacement image data are stored in said processor means, wherein said processor means is set up to replace a part of the monochrome image data in the first image signal that contains the part of the monochrome image data for each said graphic object in coded form in the first image signal, which represents said respective graphic object, before generating the second image signal, with the predetermined replacement image data, or to replace the part of the color image data corresponding to this part in the color image data of the second image signal with the predetermined replacement image data during the generation of the second image signal.

8. An interface unit in accordance with claim 1, wherein said processor means is set up to generate the second image signal in such a way that color image data of the second image signal correspond to said monochrome image data of the first image signal with the addition of color data.

9. An interface unit in accordance with claim 8, wherein said processor means:
    receives a first image signal, whose monochrome image data contain, for each image pixel, a binary value, which indicates a switching state of the respective image pixel; and
    generates the second image signal in such a way that each said binary value of the monochrome image data corresponding to an image pixel in the color image data of the second signal is replaced with a value of a length of at least two bits, which indicates the color of the respective image pixel.

10. An interface unit in accordance with claim 8, wherein said processor means generates the second image signal during the reception of the first image signal by the monochrome image data from said processor means being continuously obtained from said first image signal during a reception of the first image signal, said monochrome image data being immediately converted into color image data and being used for a continuous generation of the second image signal.

11. An interface unit in accordance with claim 1, wherein said processor means comprises a programmed microprocessor and said processor means comprises a processor and a memory.

12. An interface unit in accordance with claim 1, wherein said processor means is embodied by nonconfigurable or by configurable hardware including a programmable logic device, one or more field programmable gate-arrays and/or one or more application-specific, integrated circuits.

13. An interface unit in accordance with claim 1, wherein:
    said processor means is set up to receive the first image signal;
    said monitor activating means is part of an anesthesia apparatus; and
    the first image signal issued by said monitor activating means.

14. An apparatus comprising:
    a monitor activating means for operating a monochrome monitor for the display of data in the form of a number of graphic objects thereon, said monitor activating means issuing a first monochrome monitor image signal containing the monochrome image data, at least a part of which represents said graphic objects;
    an interface unit comprising an input connected to said monitor activating means, an output and a processor means coupled between said input and said output, said processor means for receiving said first image signal, for assigning one or more colors to each graphic object on a basis of a predetermined dependence stored in said processor means, and for generating a second image signal containing color image data for activating a color monitor and preparing said second image signal via said output terminal such that said color monitor connected to said output terminal can be activated with said second image signal, such that said graphic objects with colors assigned thereto are displayed on such color monitor.

15. An apparatus in accordance with claim 14, wherein said monitor activating means has a data processor and a graphics controller connected to said data processor, wherein said data processor is set up to issue the first image signal by means of said graphics controller, wherein said input terminal of said interface unit is connected to said graphics controller.

16. An apparatus in accordance with claim 14, wherein said monitor activating means generates the monochrome image signal in such a way that a part of its monochrome image data contains, in coded form for each said graphic object, one or more colors to be assigned to said respective graphic object, and/or that apart of monochrome image data contains, in coded form for each said graphic object, the part of the monochrome image data in said first image signal, which represents said respective graphic object.

17. An apparatus in accordance with claim 16, wherein said monitor activating means is set up, to generate the monochrome image signal in such a way that the part of its monochrome image data, which contains in coded form for each said graphic object one or more colors to be assigned to said respective graphic object and/or the part of the monochrome image data in the first image signal, which represents said respective graphic object, are image data, which are not displayed on a monitor activated with the first image signal.

18. An apparatus in accordance with claim 14, wherein said apparatus is an anesthesia apparatus.

19. A process for generating an image signal containing color image data for activating a color monitor, the process comprising:
   issuing a first image signal by a monitor activating means of an apparatus for activating a monochrome monitor;
   receiving the first image signal containing monochrome image data at a processor, at least a part of the first image signal containing monochrome image data representing a number of graphic objects, the first image signal containing monochrome image data being set up to activate a monochrome monitor, such that said graphic objects are displayed on such monochrome monitor;
   assigning one or more colors by said processor to each graphic object on a basis of a predetermined dependence stored in said processor;
   generating a second image signal containing color image data in said processor for activating a color monitor in such a way that said color monitor can be activated with the second image signal, so that said graphic objects with the colors assigned to them are displayed on such color monitor.

20. A process in accordance with claim 19, wherein to each graphic object are assigned one or more colors, said assignment for said respective graphic object being stored in said processor or for access by said processor.

21. A process in accordance with claim 19, wherein:
   the first image signal is generated by said monitor activating means in such a way that a part of the monochrome image data contains in coded form for each said graphic object one or more colors to be assigned to said respective graphic object; and
   on the basis of data stored in said processor that provide the part of the monochrome image data in the first image signal that contains in coded form for each said graphic object one or more colors to be assigned to said respective graphic object, said processor accesses such part of the monochrome image data and decodes it in order to obtain the colors to be used for the color assignment.

22. A process in accordance with claim 21, wherein in said processor, the part of the monochrome image data in the first image signal, which contains in coded form for each said graphic object one or more colors to be assigned to said respective graphic object, before generating the second image signal is replaced with predetermined replacement image data stored in said processor, or the part of the color image data corresponding to this part in the color image data of the second image signal is replaced with predetermined replacement image data stored in said processor during the generation of the second image signal.

23. A process in accordance with claim 19, wherein
   the first image signal is generated by said monitor activating means in such a way that the arrangement and size of the parts of the monochrome image data in the first image signal, which correspond to said graphic objects, are constant with regard to time within the monochrome image data; and
   said processor identifies for each said graphic object a part of the monochrome image data in the first image signal representing said respective graphic object on the basis of data stored in said processor, which data indicate the corresponding part of the monochrome image data.

24. A process in accordance with claim 19, wherein:
   the first image signal is generated by said monitor activating means in such a way that a part of the monochrome image data contains in coded form, for each said graphic object, the part of the monochrome image data in the first image signal, which represents said respective graphic object;
   on the basis of data stored in said processor, which indicate the part of the monochrome image data in the first image signal, which contains in coded form for each said graphic object the part of the monochrome image data in the first image signal, which represents said respective graphic object, said processor accesses the part of the monochrome image data containing the coded data and decodes it in order to identify the part of the monochrome image data that represents said graphic objects.

25. A process in accordance with claim 24, wherein in said processor, the part of the monochrome image data in the first image signal that represents in coded form for each said graphic object the part of the monochrome image data in the first image signal, which represents said respective graphic object, before generating the second image signal, is replaced with predetermined replacement image data stored in said processor, or the part of the color image data corresponding to this part in the color image data of the second image signal is replaced with predetermined replacement image data stored in said processor during the generation of the second image signal.

26. A process in accordance with claim 19, wherein the second image signal is generated in such a way that color data are added to the monochrome image data of the first image signal.

27. A process in accordance with claim 26, wherein:
   the first image signal is generated by said monitor activating means in such a way that for each image pixel, the first image signal has image data containing a binary value, which indicates the switching state of the respective image pixel; and
   the second image signal is generated in such a way that in the color image data of the second signal, each said binary value of the monochrome image data corresponding to an image pixel is replaced with a value having a length of at least two bits, which indicates the color of the respective image pixel.

28. A process in accordance with claim 26, wherein the second image signal is generated during the reception of the first image signal by the monochrome image data from said processor being continuously obtained from said first image signal during the reception of the first image signal, immediately being converted into color image data and being used for the continuous generation of the second image signal.

29. A process in accordance with claim 19, wherein the first image signal is received by said monitor activating means of an anesthesia apparatus.

* * * * *